United States Patent Office 3,363,979
Patented Jan. 16, 1968

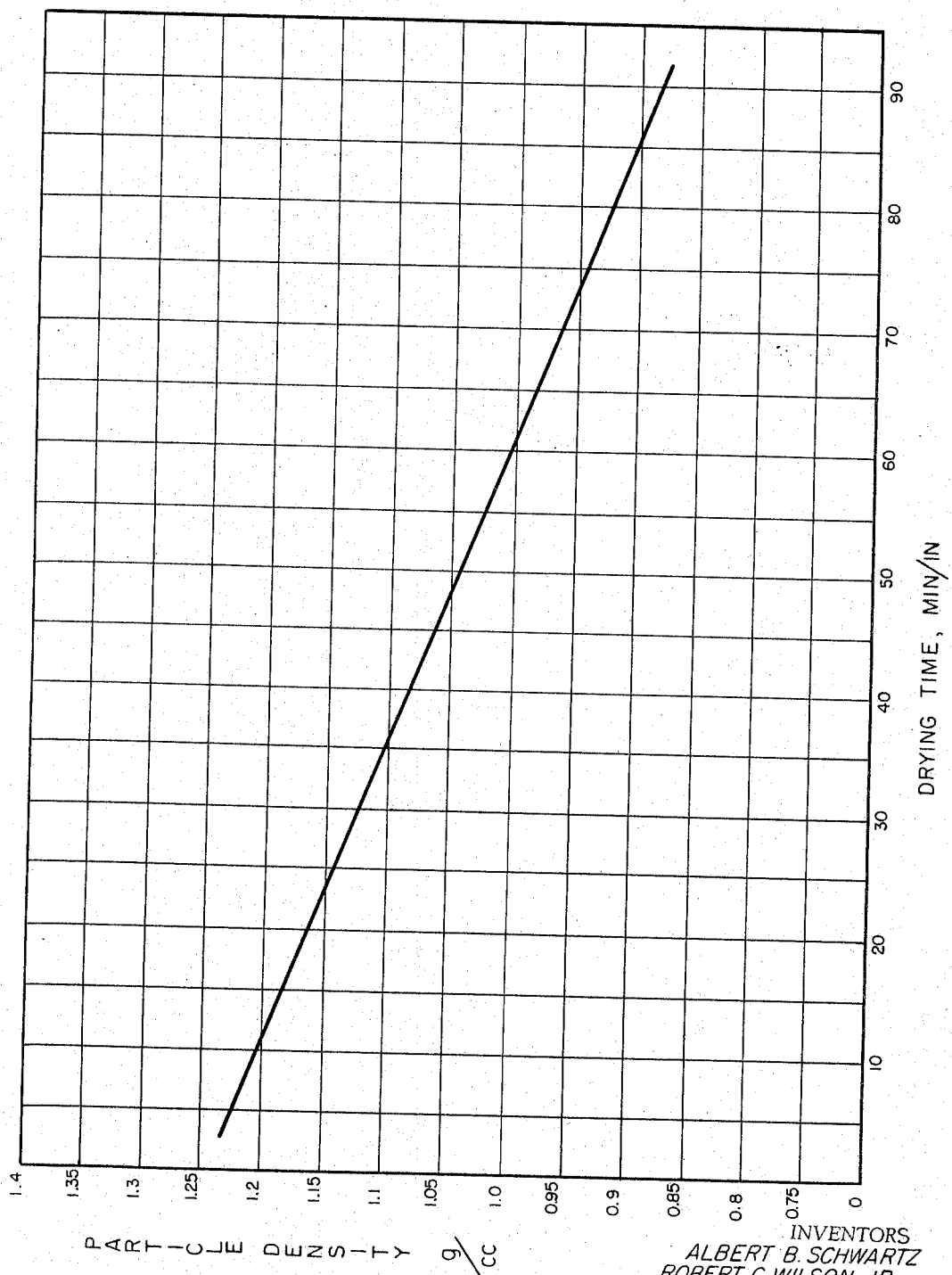

3,363,979
PROCESS FOR PRODUCING DESICCANTS
Albert B. Schwartz, Philadelphia, Pa., and Robert C. Wilson, Jr., Woodbury, N.J., assignors to Mobil Oil Corporation, a corporation of New York
Continuation-in-part of application Ser. No. 434,942, Feb. 24, 1965. This application Apr. 7, 1967, Ser. No. 633,346
10 Claims. (Cl. 23—182)

ABSTRACT OF THE DISCLOSURE

The invention is concerned with a method for producing silica gel desiccants in bead form having improved physical properties. Briefly, the method comprises forming a silica hydrogel from a precursor mixture therefor and then subjecting the resulting silica hydrogels to electrolyte aging and rapid drying.

CROSS REFERENCES TO RELATED APPLICATIONS

This application is a continuation-in-part of copending application Ser. No. 434,942, filed Feb. 24, 1965, now abandoned.

BACKGROUND OF THE INVENTION

Field of the invention

The present invention relates to methods for producing silica gel and to silica gel produced by such processes. More specifically, the present invention is concerned with methods for producing silica gel desiccants in bead form having improved physical properties.

Description of the prior art

At present, a number of inorganic adsorbents and desiccants are used in various industrial processes. Common materials put to such use are silica gel, activated alumina, and composites of silica and a metal oxide, such as silica-alumina, and the like. The composites normally comprise a large proportion of silica, usually over 90%, and small amounts of the metal oxide, and are frequently provided in the form of beads for use in fixed or moving bed contact devices.

While composites of silica and a metal oxide are generally satisfactory for many applications, there are certain processes to which they are not suited. For example, in the dehydration of olefin gases, such as ethylene, conventional silica-alumina desiccant beads containing 97% silica are unsatisfactory. This desiccant and similar silica-metal oxide desiccants are characterized by a catalytic activity which is sufficient to cause polymerization of some of the olefin stream, thus resulting in rapid fouling of the desiccant.

On the other hand, a substantially 100% silica desiccant has sufficiently low catalytic activity to permit its use in the dehydration of olefinic gases. Although it has been recognized that such a silica desiccant has a suitably low catalytic activity for olefin dehydration, 100% silica in bead form having the desired physical properties, such as attrition resistance and particle density, which varies directly with adsorption capacity, have not previously been available. For example, commercial silica gel has been prepared in a granular form having a particle density of from about 1.2 to 1.25 g./cc. which corresponds to an adsorption capacity satisfactory for use in many commercial contact devices and systems. However, in accordance with known bead manufacturing techniques, it has not been possible to produce silica beads of suitable particle density. Such methods usually result in the production of beads having a density on the order of 1.0 g./cc. or lower. It was also found that the whole bead content of the product produced by standard bead-manufacturing methods was unsatisfactory and that a large amount of fines was produced.

SUMMARY OF THE INVENTION

It is, therefore, an object of the present invention to provide a method for producing silica beads having properties of density and attrition resistance making them highly useful in fixed and moving bed contact devices.

A further object of this invention is to provide a substantially 100% silica bead desiccant having low catalytic activity for the polymerization of olefinic gases and having excellent physical properties so that it is adaptable to use in conventional commercial contact devices.

An additional object of the present invention is to provide a silica bead of controlled size, satisfactory density and good attrition resistance which is highly useful in the dehydration of olefinic gases in fixed or moving bed contact systems.

Another object of the invention is to provide a method for producing high density silica beads by a technique which yields a high percent of whole beads and relatively little fines.

In accordance with the present invention it has now been discovered that silica gel having controlled and improved physical properties can be provided by forming a silica hydrogel, treating the resultant hydrogel with an electrolyte solution prior to drying and then drying the treated hydrogel. As a further embodiment it has also been discovered that rapid drying, preferably in the presence of steam, further improves the physical properties of the bead hydrogel.

DESCRIPTION OF SPECIFIC EMBODIMENTS

Although the process of electrolyte treatment or rapid drying by steam is applicable to granular silica hydrogel, treatment of such hydrogels in bead form is preferred as illustrated in the various examples included in the present application. FIGURE 1 is a graph demonstrating the improvement in the particle density of silica gel achieved by rapid steam drying of silica hydrogel.

According to a preferred embodiment of the present invention, the first step of the process comprises forming beads of silica hydrogel.

Various conventional methods may be employed to obtain the silica hydrogel in the form of beads. One common technique comprises introducing droplets of the mixed silicate and acid gel forming solutions into a column of a non-miscible fluid, such as oil. The set-time of the solutions is such that the hydrosol sets into a hydrogel during the progress of the droplets through the non-miscible fluid.

Where fast drying techniques are to be used, gelation may be carried out at a pH ranging from −0.5 to 9, but where electrolyte aging is employed, a pH of 5 to 9 is suitable. However, the hydrogel is preferably formed at a pH of about 7.0 and at 11 P.C.

The expression P.C. refers to the product concentration and is a value obtained by the following relationship:

$$P.C. = \frac{\text{Wt. SiO}_2}{\text{Wt. SiO}_2 + \text{Wt. H}_2\text{O}} \times 100$$

The silica hydrogel beads so formed at the preferred conditions are then aged in cold aqueous medium and base exchanged. During the cold aging step, rapid cooling of the hydrogel is more effective than slow cooling and in general, it is preferred that the gel shall be cooled at a rate not substantially less than 3° F. per minute. In actual practice, the hydrogel is immersed in cold water promptly after formation. The hydrogel should be maintained in the aqueous medium at a temperature not exceeding the temperature of gelation for a period of at least 15 minutes. It has been found that with temperatures on the order of 40° F., cold aging for approximately three hours gives good results. The step of cold aging silica hydrogel is more fully described in United States Patent No. 2,462,798, issued Feb. 22, 1949.

After cold aging, the silica hydrogel is base exchanged with a dilute aqueous solution of about 1.5% by weight of acetic acid to remove any zeolitic sodium from the hydrogel. Acetic acid is greatly preferred, but phthalic acid may also be used. The use of strong acids results in low particle density and high bead breakage.

Next, the hydrogel beads are ordinarily washed with water to remove the base exchange solution and any residual salts, and they are then treated with a solution of an electrolyte.

Electrolytes are compounds whose positive and negative radicals are attracted to the negative and positive electrodes respectively when an electric current is passed through their aqueous solutions. The electrolytes, useful in the aging treatment of the present invention, include all of the common acids and salts having a pH of no more than about 3, except those which deleteriously effect the silica gel, such as hydrofluoric acid and its salts, and ammonium salts.

Non-limiting examples of suitable acids singly or in combination which may be employed as the electrolyte include sulphuric, nitric and hydrochloric, in addition to organic acids, such as formic, glycolic, oxalic, tartaric, citric and others.

Non-limiting examples of suitable salts singly or in combination which may be employed as the electrolyte include halides (except the salts of fluorine), such as chlorides, iodides or bromides; sulfates, nitrates, acetates, citrates and other organic salts of the metals in Groups I, II, III, IV, V, VI, VII and VIII of the Periodic Chart, provided they are sufficiently soluble and have a pH below about 3. Illustrative examples are shown in Table I.

ducted rapidly, i.e., for less than 35 to 40 minutes for each inch of bed depth. With steam at about 250° F., drying can be accomplished within this time if the steam is passed through the bed of beads at a rate greater than about 500 cubic feet per minute per cubic foot of silica hydrogel beads.

The final step of the process generally comprises calcining or high temperature heating of the beads in air for from about ½ to 10 hours. The calcining temperature may range from about 350° F. to 600° F. and preferably is about 400° F.

This invention also includes silica gel compositions and processes for preparing such compositions that comprise both electrolyte aging and rapid drying. Thus, a silica hydrogel may be prepared after which it is treated with an electrolyte, e.g., an acid or salt followed by rapid drying in a gas such as steam. The combined steps of electrolyte treating and rapid drying are applicable to granular silica hydrogel, but bead hydrogel, as illustrated by the examples, is the preferred form. Rapid drying of bead hydrogel after electrolyte treatment is preferably effected by steam because of the greater yield of whole beads, whereas granular silica hydrogel can be dried rapidly in steam or air after electrolyte treatment, since attrition of the final product is not as great a problem as it is in bead production. The conditions applicable to the combined treatment are generally the same as those employed where electrolyte or rapid drying treatment is used alone.

The present invention will be more fully understood in the light of the following examples which illustrate some of the preferred methods for producing silica beads.

*Example I.*—Silica beads were formed by continuously mixing an aqueous sodium silicate solution containing 19.1% by weight $SiO_2$ and 5.9% by weight $Na_2O$ with a sulphuric acid solution containing 10.3% by weight $H_2SO_4$. The solutions were mixed at the rates of 400 ml./min. of sodium silicate and 392 ml./min. of sulphuric acid at 42° F.

TABLE I

| Group | Salt | Formula | Solubility Grams/100 ml. $H_2O$ | Temp., °C. | pH of 5% Solution at 25° C. |
|---|---|---|---|---|---|
| III | Aluminum sulfate | $Al_2(SO_4)_3 \cdot 18H_2O$ | 86.9 | 0 | 2.0–3.0 |
| IV | Zirconium sulfate | $Zr(SO_4)_2 \cdot 4H_2O$ | 146 | 39.5 | <2 |
|  | Stannic chloride | $SnCl_4 \cdot 5H_2O$ | S. | Cold | 2.0–4.0 |
| V | Vanadyl sulfate | $VOSO_4 \cdot 2H_2O$ | V.S. | Cold | 1.0–3.0 |
| VI | Chromic nitrate | $Cr(NO_3)_3 \cdot 9H_2O$ | S. | Cold | 2.0–3.0 |
| VIII | Ferric sulfate | $Fe_2(SO_4)_3 \cdot 9H_2O$ | 440 | Cold | 1.0–3.0 |

Compatible combinations of the above inorganic and organic acids and/or salts can also be used as electrolytes for the purpose of this invention. By definition, however, the term "acid" or "salt" as used in the specification and claims shall exclude all fluorine and ammonium compounds.

The electrolyte solution may have a concentration of from about 0.005% to 1.0%.

The silica hydrogel is contacted for from about ¼ hour to 12 hours or longer with sufficient electrolyte solution to completely submerge the particles. This minimum amount is about 0.35 to 0.55 volume of solution per apparent volume of particles, but excess solution can be used. Static aging is usually employed, but the solution may be circulated through the bed of hydrogel particles if desired.

The hydrogel particles may be dried in air, steam or their equivalents. When the particles are in bead form, they are preferably contacted in a bed with steam at a temperature of from 220 to 500° F., with the best results being obtained at about 250° F. This type of drying results in maximum improvement in bead density if con- Droplets of the mixed solutions were set in the form of beads and were then aged for 3 hours in water at 40° F. The beads were then base exchanged for three two-hour periods at 40° F. and for six two-hour periods at room temperature with a 1.5% solution of acetic acid.

The beads were then washed with water for about 16 hours.

The particle density of the beads formed in this manner was 1.02 g./cc. and 76% by weight of the product was in the form of whole beads.

*Example II.*—Silica beads prepared in the same run as described in Example I were contacted, after washing, with a 0.1% by weight aqueous solution of $SnCl_4$ for 6 hours. The pH of the solution was 2.4.

The silica beads treated in this electrolyte solution had a density of 1.25 and a whole bead content of 82%.

*Example III.*—A second run was conducted to prepare silica hydrogel beads in the same manner as in Example I, and the untreated beads had a density of 1.00 and a whole bead content of 43%.

*Example IV.*—Silica hydrogel beads prepared in the second run were treated, after washing, for 8 hours in a solution containing 0.1% SnCl₄ and 0.3% HCl and having a pH of 1.5. The treated beads had a density of 1.24 and a whole bead content of 53%.

*Example V.*—Silica hydrogel beads prepared in the second run were treated, after washing, for 8 hours in a solution containing 0.1% Fe₂(SO₄)₃ and 0.7% H₂SO₄ and having a pH of 1.4. The electrolyte treated silica beads had a density of 1.24 and a whole bead content of 70%.

*Example VI.*—Silica hydrogel beads prepared in the second run were treated, after washing, for 8 hours in a solution containing 0.1% Zr(SO₄)₂ and 0.5% H₂SO₄ and having a pH of 1.3. The electrolyte-treated silica beads had a density of 1.24 and a whole bead content of 75%.

*Example VII.*—Silica hydrogel beads prepared in the second run were treated, after washing, for 8 hours in an aqueous solution containing 0.1% by weight of H₂SO₄ and having a pH of 2.0. The treated beads had a density of 1.24 and a whole bead content of 67%.

*Example VIII.*—Silica hydrogel beads prepared in the second run were treated, after washing, for 8 hours in an aqueous solution containing 0.1% CH₃COOH and having a pH of 3.7. The treated silica beads had a density of 1.07 and a whole bead content of 52%.

*Example IX.*—Silica hydrogel beads were prepared in a third run conducted in the same manner as described in Example I. The untreated silica beads had a density of 1.05 and a whole bead content of 83%.

*Example X.*—Silica hydrogel beads prepared in the third run were treated, after washing, for 7 hours in an aqueous electrolyte solution containing 0.01% H₂SO₄ and having a pH of 2.9. The treated beads had a density of 1.10 and a whole bead content of 91%.

*Example XI.*—Silica hydrogel beads prepared in the third run were treated, after washing, for 7 hours in an aqueous electrolyte solution containing 0.1% H₂SO₄ and having a pH of 1.8. The treated beads had a density of 1.29 and a whole bead content of 87%.

A summary of the conditions employed in Examples I–XI and the results obtained appear in Table II.

TABLE III

| Example Number [1] | Steam Velocity, ft./min. | Depth of Bed, inches | Drying Time, min./inches of bed depth | Particle Density, g./cc. |
|---|---|---|---|---|
| 12 | 50 | 4 | 82 | 0.84 |
| 13 | 80 | 4 | 52 | 0.91 |
| 14 | 80 | 4 | 52 | 0.99 |
| 15 | 80 | 4 | 52 | 1.02 |
| 16 | 80 | 4 | 52 | 1.06 |
| 17 | 80 | 4 | 50 | 1.05 |
| 18 | 80 | 4 | 47 | 0.99 |
| 19 | 80 | 4 | 47 | 1.00 |
| 20 | 80 | 4 | 47 | 1.01 |
| 21 | 80 | 2 | 47 | 1.10 |
| 22 | 80 | 4 | 45 | 1.00 |
| 23 | 80 | 2 | 37 | 1.07 |
| 24 | 80 | 1 | 35 | 1.19 |
| 25 | 80 | 2 | 32 | 1.13 |
| 26 | 240 | 4 | 26 | 1.10 |
| 27 | 240 | 4 | 20 | 1.10 |
| 28 | 240 | 2 | 17 | 1.22 |
| 29 | 240 | 2 | 17 | 1.25 |
| 30 | 240 | 2 | 15 | 1.18 |
| 31 | 240 | 2 | 15 | 1.24 |
| 32 | 240 | 2 | 15 | 1.27 |
| 33 | 240 | 4 | 14 | 1.22 |
| 34 | 240 | 2 | 12 | 1.16 |

[1] Steam temperature, 250° F.; bed area, 3.5 square feet.

As can be seen from Table III, the density of silica beads produced by drying silica hydrogel beads with steam increases as the drying time decreases. The more rapid drying is accomplished by increasing the rate of flow of steam through the bed of silica hydrogel beads or by decreasing the bed depth.

It will be seen by reference to the accompanying drawing, which graphically illustrates the increase in silica bead density with more rapid drying, that beads having a density of about 1.1 or higher are obtained where the drying time is under 35 to 40 minutes per inch of bed thickness.

Where drying time is over 35 to 40 minutes per inch of bed thickness, the density of the beads produced is substantially lower, ranging from 1.1 down to about 0.85. The beads are considered to be dry below a level of moisture comprising 0.3 lb. or less moisture per pound solids.

TABLE II.—ELECTROLYTE AGING OF WASHED SILICA HYDROGEL

| Example Number | Bead Forming Run Number | Electrolyte Aging Conditions | | | | Properties of Product | |
|---|---|---|---|---|---|---|---|
| | | Electrolyte | | pH | Time, Hours | Whole Bead Content, Percent Wt. | Particle Density, g./cc. |
| | | Salt | Acid | | | | |
| 1 | 1 | None | None | | | 76 | 1.02 |
| 2 | 1 | 0.1% SnCl₄ | ----do---- | 2.4 | 6 | 82 | 1.25 |
| 3 | 2 | None | ----do---- | | | 43 | 1.00 |
| 4 | 2 | 0.1% SnCl₄ | 0.3% HCl | 1.5 | 8 | 53 | 1.24 |
| 5 | 2 | 0.1% Fe₂(SO₄)₃ | 0.7% H₂SO₄ | 1.4 | 8 | 70 | 1.24 |
| 6 | 2 | 0.1% Zr(SO₄)₂ | 0.5% H₂SO₄ | 1.3 | 8 | 75 | 1.24 |
| 7 | 2 | None | 0.1% H₂SO₄ | 2.0 | 8 | 67 | 1.24 |
| 8 | 2 | ----do---- | 0.1% HOAc | 3.7 | 8 | 52 | 1.07 |
| 9 | 3 | ----do---- | None | | | 83 | 1.05 |
| 10 | 3 | ----do---- | 0.01% H₂SO₄ | 2.9 | 7 | 91 | 1.10 |
| 11 | 3 | ----do---- | 0.1% H₂SO₄ | 1.8 | 7 | 87 | 1.29 |

From a comparison of the data in Table II, it appears that a great improvement in whole bead content and density is realized with strong mineral acids, such as sulphuric acid of Example VII, while with weaker organic acids, such as acetic acid of Example VIII, having a pH higher than 3, the whole bead content and particle density are lower or about the same as those examples wherein no electrolyte aging was carried out (Examples 1, 3 and 9).

The data also indicate that the improvement in density is related to acid concentration as evidenced by a comparison of the results of Examples X and XI.

*Examples XII–XXXIV.*—Silica hydrogel beads formed and treated as described in Example I were subjected to rapid steam drying while in beds as detailed in Table III.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

We claim:

1. A method for producing a high density silica gel comprising:
   forming a silica hydrosol,
   permitting said hydrosol to set to a hydrogel, aging said hydrogel in aqueous medium at a temperature not exceeding the temperature of gelation for a period of at least 15 minutes,
water washing said hydrogel free of soluble salts,
treating the washed hydrogel with a water solution of an electrolyte selected from the group consisting of a mineral acid, a metal salt thereof and mixtures of said acid and said salt at a pH of not more than 3, and
drying the hydrogel so treated.

2. A method for producing a high density silica gel comprising:
forming a silica hydrosol,
permitting said hydrosol to set to a hydrogel,
aging said hydrogel in aqueous medium at a temperature not exceeding the temperature of gelation for a period of at least 15 minutes,
base exchanging said hydrogel to remove zeolitic sodium,
water washing said hydrogel free of soluble salts,
treating said hydrogel in an electrolyte selected from the group consisting of a mineral acid, a metal salt thereof and mixtures of said acid and said salt at a pH of not more than 3, said electrolyte being present at a concentration from about 0.005% to 1% by weight,
drying the hydrogel so treated, and
calcining the gel.

3. The process of claim 2 where said electrolyte is selected from at least one member of the group consisting of sulphuric acid, nitric acid, hydrochloric acid, formic acid, glycolic acid, oxalic acid, tartaric acid, citric acid, and the chlorides, bromides, iodides, sulphates, nitrates, acetates and citrates of sodium, potassium, calcium, aluminum, magnesium, silver, tin, iron, cobalt, manganese, chromium, vanadium, zirconium, and the rare earth metals.

4. The process of claim 2 wherein said hydrogel is treated in an electrolyte for a period from 15 minutes to 12 hours.

5. A method for producing a high density silica gel comprising:
forming a silica hydrosol,
permitting said hydrosol to set to a hydrogel,
aging said hydrogel in aqueous medium at a temperature not exceeding the temperature of gelation for a period of at least 15 minutes,
base exchanging said hydrogel to remove zeolitic sodium,
water washing said hydrogel free of soluble salts,
treating the washed hydrogel with a solution of an electrolyte selected from the group consisting of a mineral acid, a metal salt thereof and mixtures of said acid and said salt at a pH of not more than 3,
rapidly drying the resulting electrolyte treated hydrogel bed at a rate less than 35 minutes per inch of said bed, and
calcining the gel.

6. The process of claim 5 where rapid drying is accomplished in the presence of steam.

7. A method for producing a high density silica gel comprising:
forming a silica hydrosol,
permitting said hydrosol to set to a hydrogel,
aging said hydrogel in aqueous medium at a temperature not exceeding the temperature of gelation for a period of at least 15 minutes,
base exchanging said hydrogel to remove zeolitic sodium,
water washing said hydrogel free of soluble salts,
treating the washed hydrogel with a solution of an electrolyte selected from the group consisting of a mineral acid, a metal salt thereof and mixtures of said acid and said salt at a pH of not more than 3,
rapidly drying the resulting hydrogel bed to a moisture content of less than 0.3 pound of moisture per pound of solids at a rate less than 35 to 40 minutes per inch of said hydrogel by means of a gas at elevated temperatures, and
calcining the gel.

8. The process of claim 7 where said gas is conducted through said hydrogel at a rate greater than about 500 cubic feet per minute per cubic foot of hydrogel.

9. The process of claim 7 where said gas is at a temperature from 220 to 500° F.

10. The process of claim 7 where said gas is steam.

References Cited
UNITED STATES PATENTS

| | | | |
|---|---|---|---|
| 2,462,798 | 2/1949 | Wilson | 23—182 X |
| 2,746,935 | 5/1956 | Weisz | 252—448 |
| 3,015,620 | 1/1962 | Plank et al. | 252—448 X |
| 3,146,076 | 8/1964 | Talvenheimo | 252—448 X |
| 3,243,262 | 3/1966 | Carr et al. | 23—182 |

MILTON WEISSMAN, *Primary Examiner.*

A. J. GREIF, *Assistant Examiner.*